United States Patent
Biecker et al.

(10) Patent No.: US 6,814,391 B2
(45) Date of Patent: Nov. 9, 2004

(54) CONVERTIBLE MOTOR VEHICLE ROOF

(75) Inventors: Peter Biecker, Oberhaching (DE);
Marco Lauterbach, Kasendorf (DE);
Gerhard Schwarz, Planegg (DE); Fritz Wegener, Gilching (DE); Burkhard Reinsch, Kaufbeuren (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 180 days.

(21) Appl. No.: 10/073,349

(22) Filed: Feb. 13, 2002

(65) Prior Publication Data

US 2002/0185885 A1 Dec. 12, 2002

(30) Foreign Application Priority Data

Feb. 13, 2001 (DE) .......................................... 101 07 078

(51) Int. Cl.⁷ .................................................. B60J 7/10
(52) U.S. Cl. ............... 296/108; 296/107.18; 296/107.2; 296/220.01
(58) Field of Search ........................... 296/108, 107.01, 296/107.16, 107.17, 107.18, 107.19, 107.2, 220.01, 116

(56) References Cited

U.S. PATENT DOCUMENTS 2,434,711 A * 1/1948 Mobbs et al. ............... 296/222
5,558,388 A * 9/1996 Furst et al. ............... 296/107.2
6,390,531 B1 * 5/2002 Schutt .................... 296/107.13
6,412,860 B1 * 7/2002 Reinsch ...................... 296/219
6,419,295 B1 * 7/2002 Neubrand ............... 296/107.07
6,497,448 B1 * 12/2002 Curtis et al. ............. 296/146.8

FOREIGN PATENT DOCUMENTS

| DE | 198 07 327 C1 | 9/1999 | |
| EP | 05544694 A2 * | 8/1993 | ............ 296/107.18 |
| EP | 0 704 330 A1 | 4/1996 | |

* cited by examiner

Primary Examiner—Patricia L. Engle
(74) Attorney, Agent, or Firm—Nixon Peabody LLP; David S. Safran

(57) ABSTRACT

A convertible motor vehicle roof with a roof part (12), with a rear part (14) which adjoins the roof part, and with side roof members (10) which are pivotally coupled on both sides to the roof part (12). To open the motor vehicle roof, the rear part (14) together with the roof part (12) and the side roof members (10) can be lowered into a stowage space (22) located in the rear and the side roof members (10) can be swung to the outside before or during lowering into the storage space (22), the swivel bearing means (28) which supports the respective side roof member (10) on the roof part (12) having at least two connecting rods or a connecting rod and a crank guide and being formed especially as a planar four-joint linkage.

11 Claims, 21 Drawing Sheets

CONVERTIBLE MOTOR VEHICLE ROOF

BACKGROUND OF THE INVENTION

1. Field of the Invention

The invention relates to a convertible motor vehicle roof with a roof part, with a rear part which adjoins the roof part, and with side roof members which are pivotally coupled on both sides to the roof part, and to open the motor vehicle roof the rear part together with the roof part and the side roof members can be lowered into a stowage space located in the rear and the side roof members can be swung to the outside before or during lowering into the storage space.

2. Description of Related Art

One such motor vehicle roof is disclosed in German Patent DE 198 07 327 C1 which, however, is not concerned in detail with the configuration of the pivot support of the side roof member.

SUMMARY OF THE INVENTION

A primary object of the invention is to form a motor vehicle roof of the initially mentioned type with an articulated coupling of the side roof members to the roof part, which coupling provides a durable mechanism with a simple structure for executing the desired motion.

The above object is achieved in the aforementioned motor vehicle roof in accordance with the invention in that a swivel bearing means supports the respective side roof members on the roof part and has at least two connecting rods or a connecting rod and a guide slot. This configuration allows implementation of a plurality of embodiments which have a durable and reliable structure.

Feasibly, the swivel bearing means contains a front connecting rod and a rear connecting rod which for in a planar four-joint linkage in which all axes of the four-joint linkage are perpendicular to a slanted plane. The plane is, for example, a lengthwise plane which is tilted downwardly and outwardly relative to horizontal. According to the structural localization of the location of the plane, the pivoting behavior of the side roof member can be set. The planar four-joint linkage has a simple and durable structure.

According to another preferred embodiment, the swivel bearing means contains a front connecting rod and a rear connecting rod which form a spherical four-joint linkage in which all axes of the four-joint linkage meet at an intersection point. The joints of the connecting rods, for example hinge joints, contain a pivot axle and the joints on the side roof members move on a spherical surface. The swivelling behavior of the side roof members is fixed by the structural localization of the intersection point.

According to another preferred embodiment, the swivel bearing means contains a front connecting rod, a middle connecting rod and a rear connecting rod which form a three-dimensional, seven-joint linkage, the joints located on the side roof members being socket joints and the socket joint of the middle connecting rod being located outside the connecting line between the socket joints of the front and the rear connecting rod. The three-dimensional, seven-joint linkage offers diverse possibilities for implementation of the swivelling motions of the side roof member. Driving of the swivel bearing means can proceed on the front connecting rod or on the rear connecting rod. Functionally the middle connecting rod controls the tilting motion of the side roof member via a lever arm.

Another preferred embodiment calls for the swivel bearing means to have a front connecting rod and a rear guide slot which is located on the side roof member and on which the swivel bearing of the roof part is movably supported. Driving of the swivel bearing means takes place preferably on the connecting rod and the side roof member moves on the circular path of the connecting rod and along the guide slot.

Driving of the swivel bearing means takes place preferably, for example, via a drive means which is moved by the motion of the bearing means which supports the roof part on the body, for example, the motion of a four joint linkage arrangement with the main column and the main connecting rod pivotally supported on the body. Thus, a special drive is not necessary.

Embodiments of the invention are explain in detail with reference to the accompanying drawings.

DETAILED DESCRIPTION OF THE DRAWING

Figure 1:
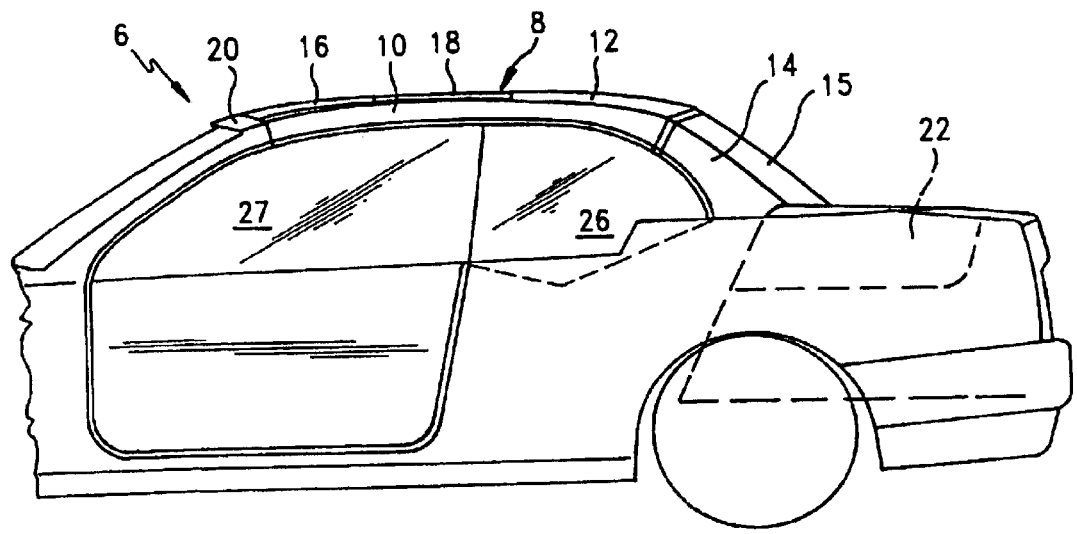
FIG. 1 is a schematic side view of a motor vehicle with a convertible roof in the closed position.
Figure 2:
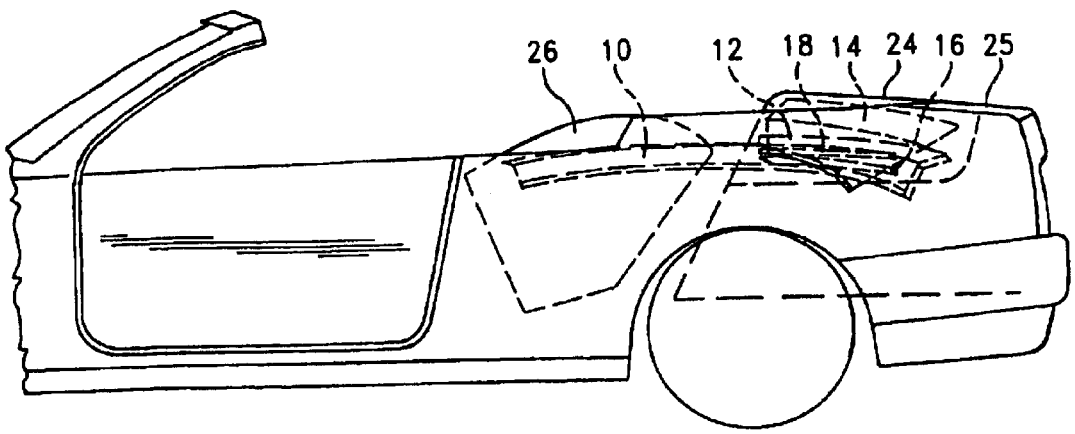
FIG. 2 shows the FIG. 1 motor vehicle with the roof opened and lowered.
Figure 3:
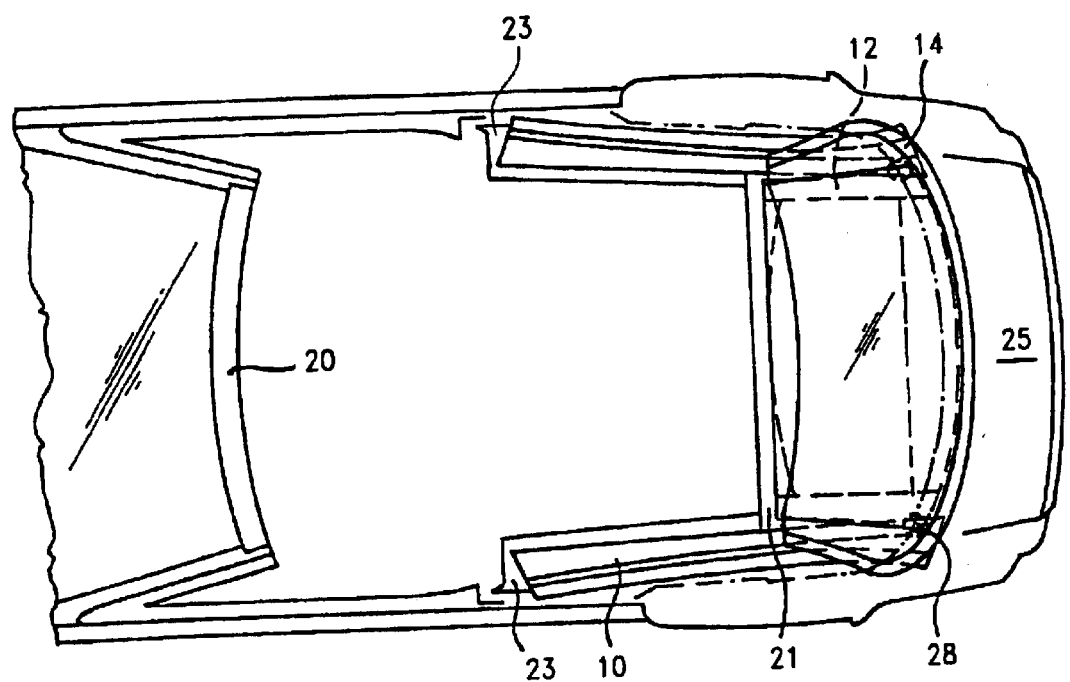
FIG. 3 is a plan view of the motor vehicle with the roof opened and lowered.
Figure 4:
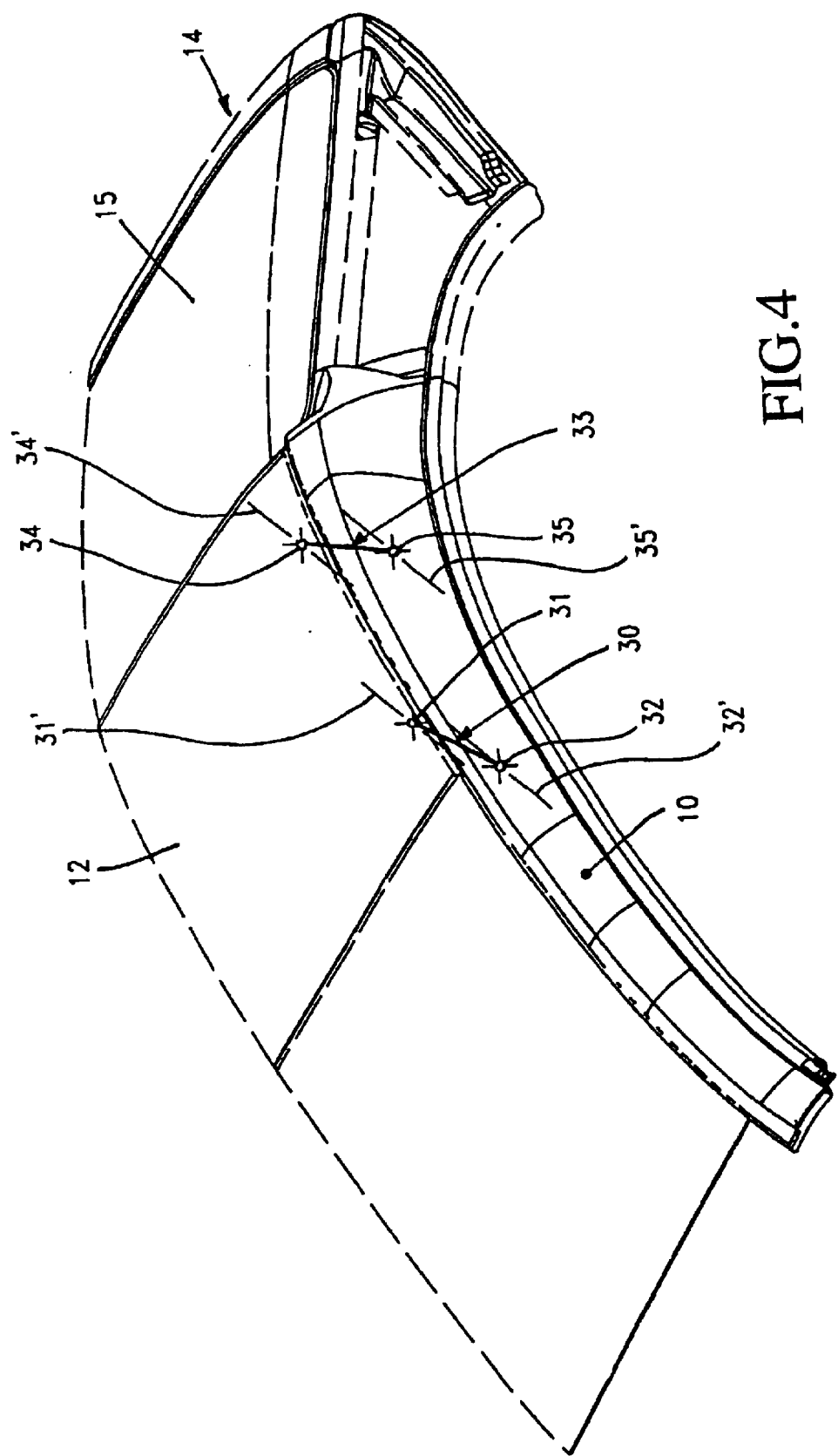
FIG. 4 is a perspective view of the left half of the closed motor vehicle roof with a first embodiment of a swivel bearing means for the movable roof part.

The motor vehicle 6 which is shown in FIGS. 1 to 3 has a convertible roof 8 which comprises a respective side roof member 10 on each side of the roof, a rear roof part 12, a rear part 14 with a rear window 15, and for example, two front movable roof parts 16, 18. The motor vehicle roof 8 can be opened by means of a lowering mechanism (not shown) and can be lowered into a stowage space 22 which, in a plan view, has a U-shape that extends around a rear bench seat and comprises two lateral areas 23 and a rear area 21. The rear area 21 of the stowage space 22, which is located behind the rear seat, can be covered via a rear cover element 24 which is coupled to the body to be able to pivot in the area of the joint to the trunk lid 25. The lateral areas 23 of the stowage space 22, which are located between the outside contour of the motor vehicle and the rear bench seat, can be covered in the manner known, for example, from published European Patent Application EP 0 704 330 A1, likewise, by the side flaps of a soft top.

The side roof members 10 extend along the entire length of the rear roof part 12 and the two movable roof parts 16, 18, between a stationary front roof part or apron 20 and the rear part 14. In the closed position of the motor vehicle roof (see FIG. 1), the two side roof members 10 are interlocked to the front roof part 20. The movable roof parts 16, 18 are made, in the conventional manner, as the cover of a sliding roof, and with the motor vehicle roof closed, can be pushed in the lengthwise direction of the motor vehicle to under the rear roof part 12 into any open positions. In the rear end position of the two movable roof parts 16, 18, the front movable roof part 16 is under the rear movable roof part 18 and the two roof parts are located with their front edges roughly flush with the front edge of the rear roof part 12. The lengthwise displacement of the movable roof parts 16, 18 is guided via guide rails which are located on the side roof members 10 and which are configured in the manner which is conventional for sliding roofs.

To be able to place the two lateral areas 23 of the stowage space 22 as far as possible against the outside contour of the motor vehicle and thus limit the width of the rear bench seat as little as possible, the two side roof members 10 are connected to the rear roof part 12 via a swivel bearing means 28 and by means of the latter can be swung outwardly in the direction to the outside contour of the body when the motor vehicle roof is being opened. The swivel bearing means 28 is described below using four embodiments.

With the motor vehicle roof closed (see FIG. 1), the motor vehicle 8 creates the impression of a coupe, different ventilation possibilities arising via the two movable roof parts 16, 18 and via the door side windows 27 and rear side windows 26 which can be lowered independently of one another.

To convert the motor vehicle into a convertible (see FIGS. 2 & 3), in the opening and lowering process of the motor vehicle roof 8 out of its closed position, first the door side windows 27 and the rear side windows 26 are lowered and the two movable roof parts 16, 18 are pushed completely under the rear roof part 12. Then, the soft side top flaps of the side areas 23 of the stowage space are opened and the rear part 14 is swung over the rear roof part 12. After the rear cover element 24 of the rear stowage space area 21 is also opened and the interlocks of the two side roof members 10 with the front roof part or apron 20 are released, the motor vehicle roof 8 can be lowered and the side roof members 10 can be swung to the outside, the swivelling process of the side roof members 10 being completed before the side roof members 10 are lowered in the side areas 23 of the stowage space 22. The swivelling motion of the side roof members 10 can also be ended before the lowering process if they have their own drive. Finally, the soft side top flaps of the side areas 23 of the stowage space 22 and the rear cover element 24 are closed again. The closing process of the motor vehicle roof 8 takes place in an analogously reverse sequence.

The invention can be used not only for convertible motor vehicle roofs according to the examples described using FIGS. 1 to 3, but also in a soft top system in which the rear roof part and the rear part are hinged to one another and do not travel over one on another, but fold over one another before lowering into the stowage space.

Figure 5:
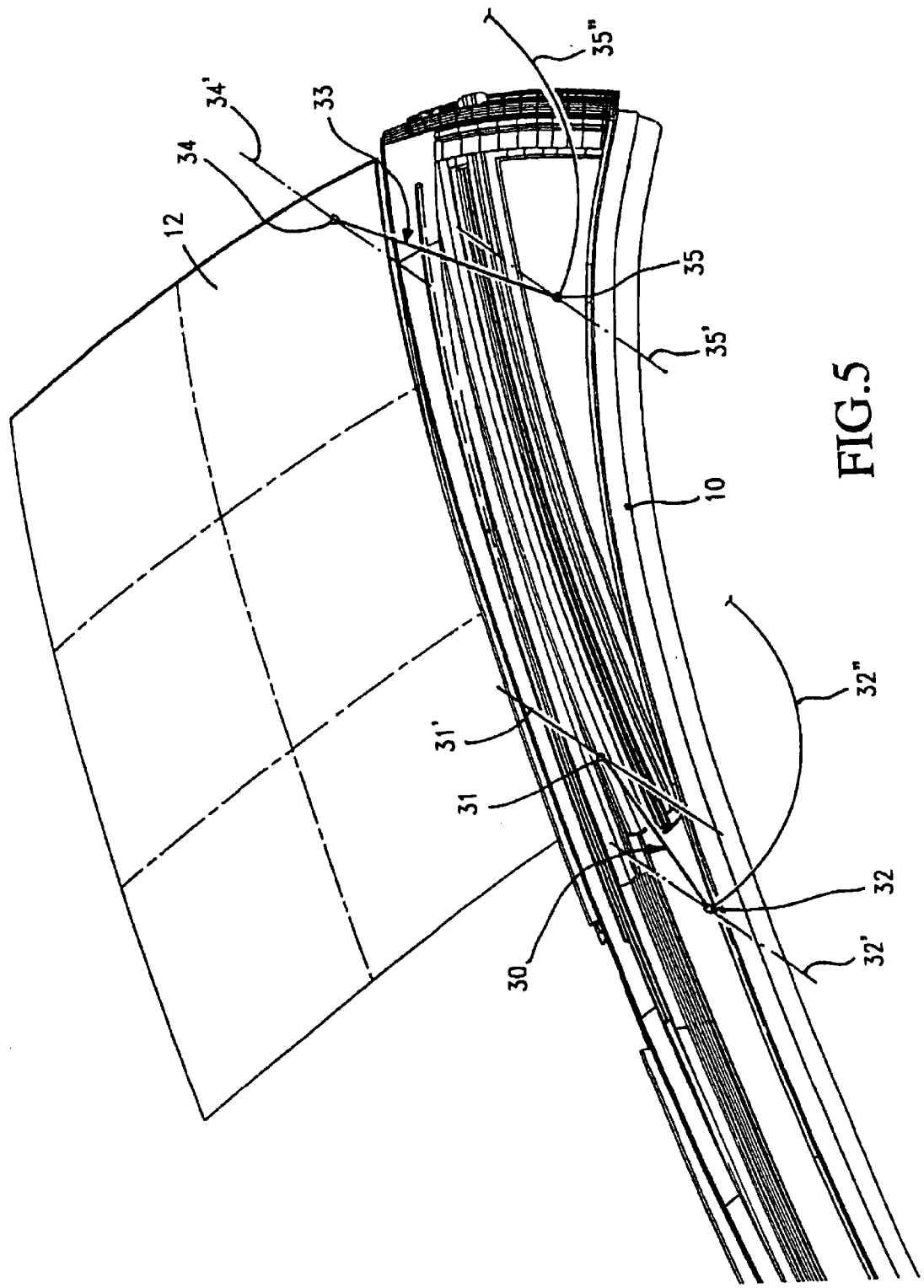
FIG. 5 is an enlarged perspective plan view of the side roof member of the embodiment shown in FIG. 4, with the roof closed.
Figure 6:
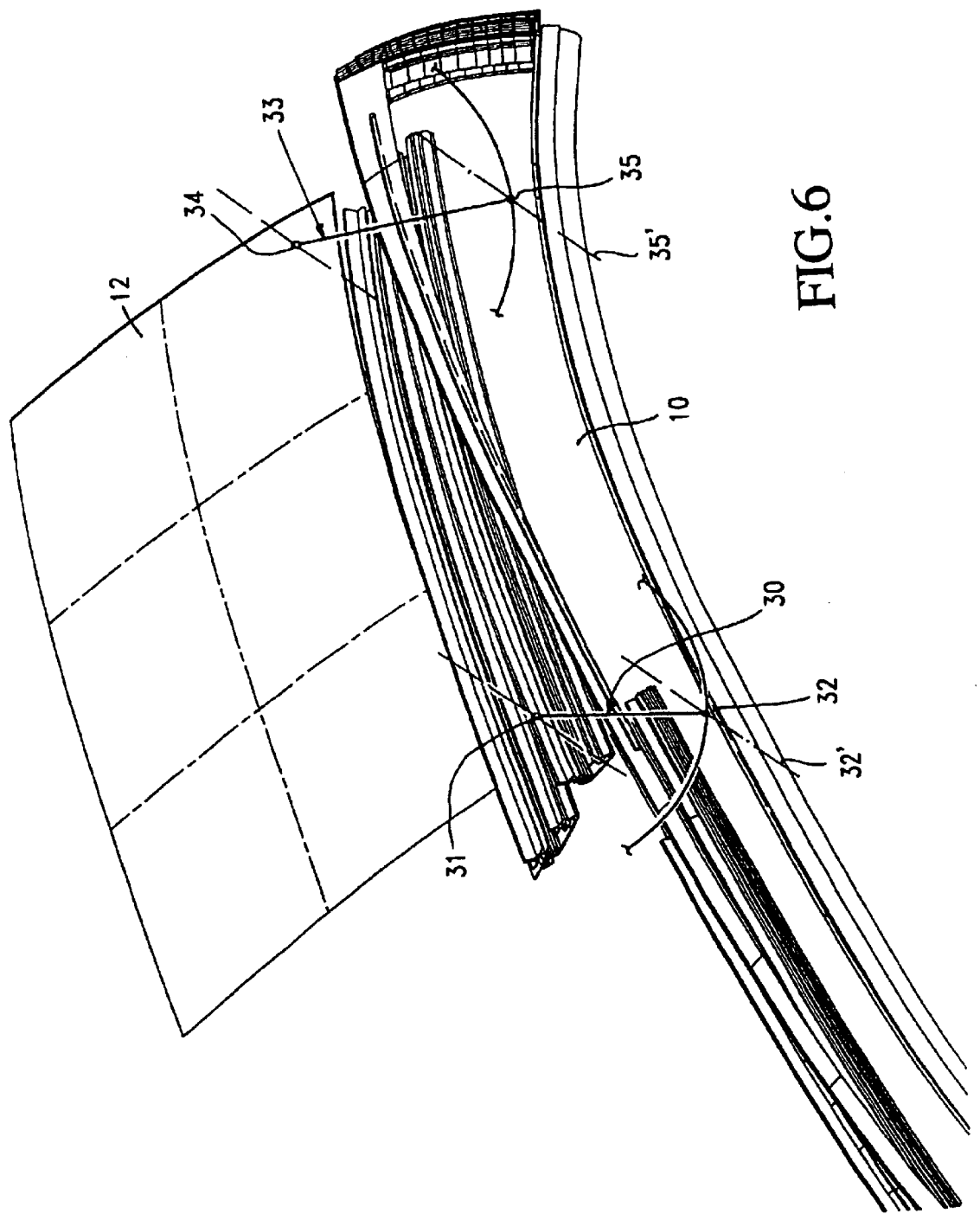
FIG. 6 is an enlarged perspective plan view of the side roof member of the embodiment shown in FIG. 4 in an intermediate swivelling position.
Figure 7:
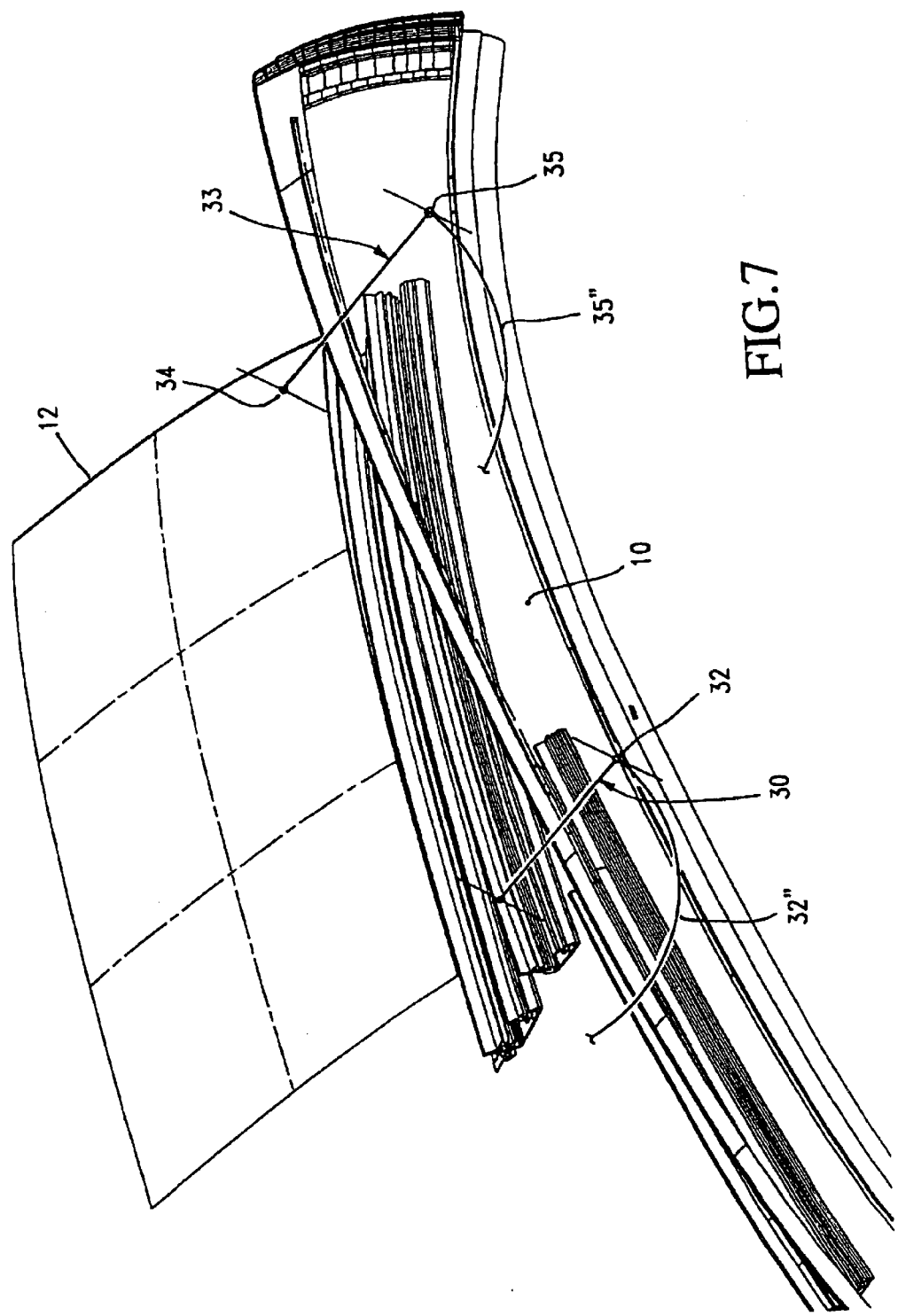
FIG. 7 is an enlarged perspective plan view of the side roof member of the embodiment shown in FIG. 4 in the end swivelling position with the roof opened.
Figure 8:
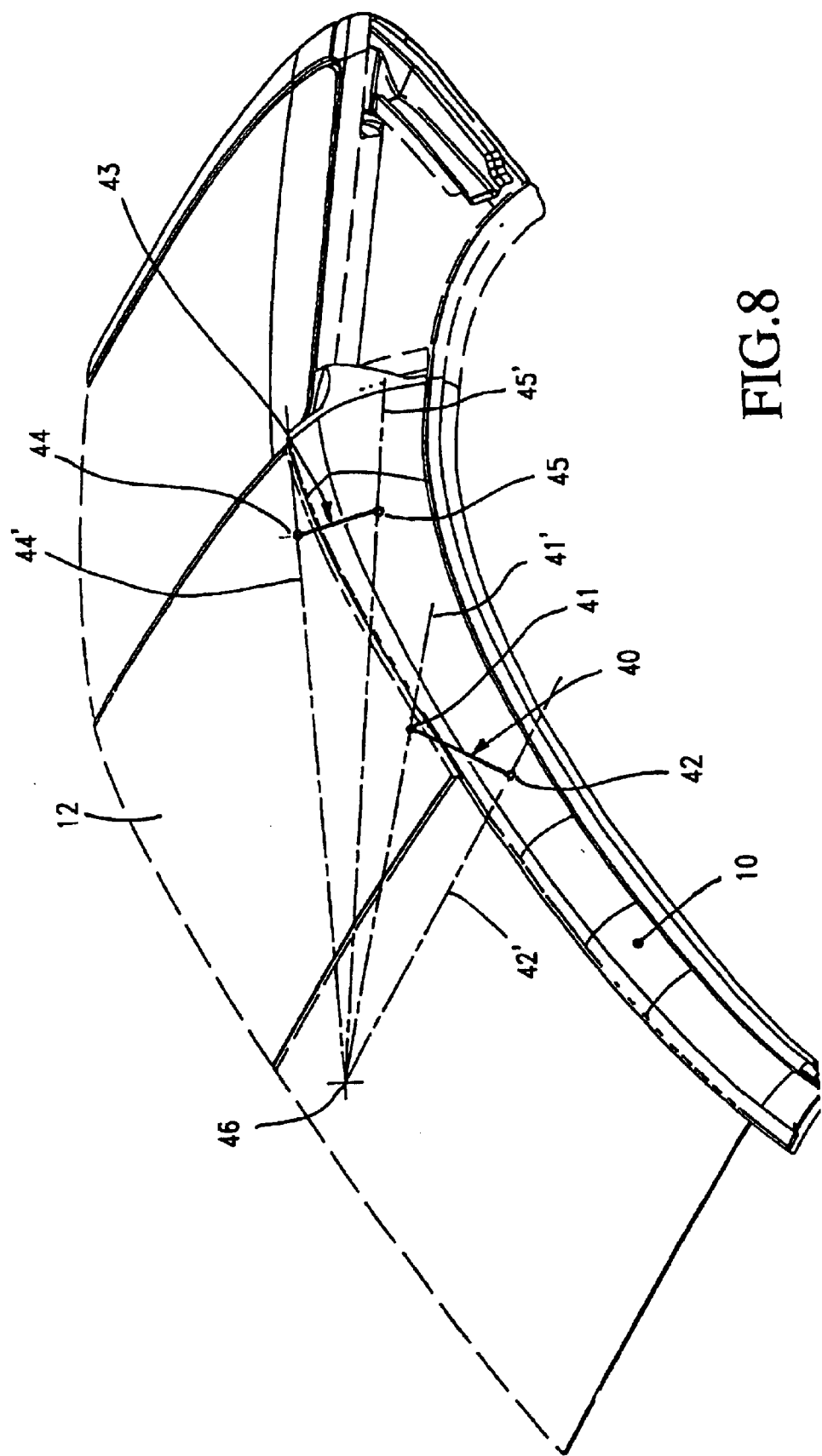
FIG. 8 is a perspective view of the left half of the closed motor vehicle roof with a second embodiment of a swivel bearing means for the movable roof part.

The first embodiment of the swivel bearing means 28 (see FIGS. 4 to 7) is formed as a flat four-joint linkage and contains a front connecting rod 30 which is coupled by a joint 31 to the rear roof part 12 and a joint 32 to the side roof member 10 and a rear connecting rod 33 which is coupled by the joint 34 to the rear roof part 12 and a joint 35 to the side roof member 10 (the connecting rods are shown schematically as lines). The swivelling axes 31', 34' of the joints 31, 34 which are located on the rear roof part 12 are parallel to one another and perpendicular to the plane which is tilted for the desired swivelling behavior. The planar paths or curves 32" and 35" of motion of the two joints 32, 35 on the side roof member 10 run in planes which are parallel to one another in the swivelling motion of the side roof member 10 out of its position with the motor vehicle roof closed (FIG. 5) via an intermediate position (FIG. 6) up to its maximum swivelling position (FIG. 7) in which the opened motor vehicle roof can be lowered into the stowage space 22.

Driving takes place, for example, by a rear connecting rod 33 executing swivelling motion over a smaller swivelling angle which relative to the front connecting rod 30, this motion being derived from the main four-joint linkage which supports the front roof part 12 on the body.

Figure 9:
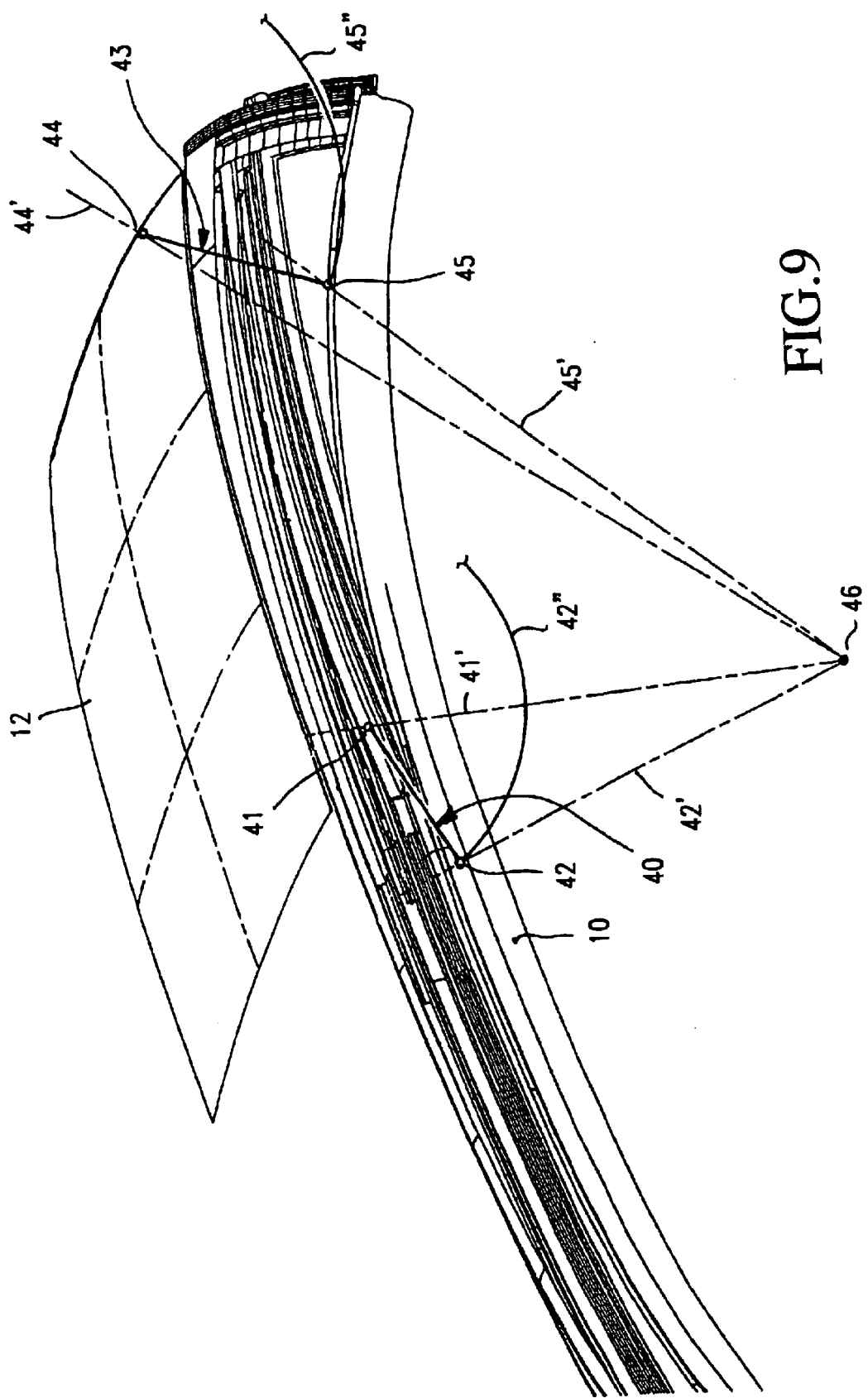
FIG. 9 is an enlarged perspective plan view of the side roof member of the embodiment shown in FIG. 8, with the roof closed.
Figure 10:
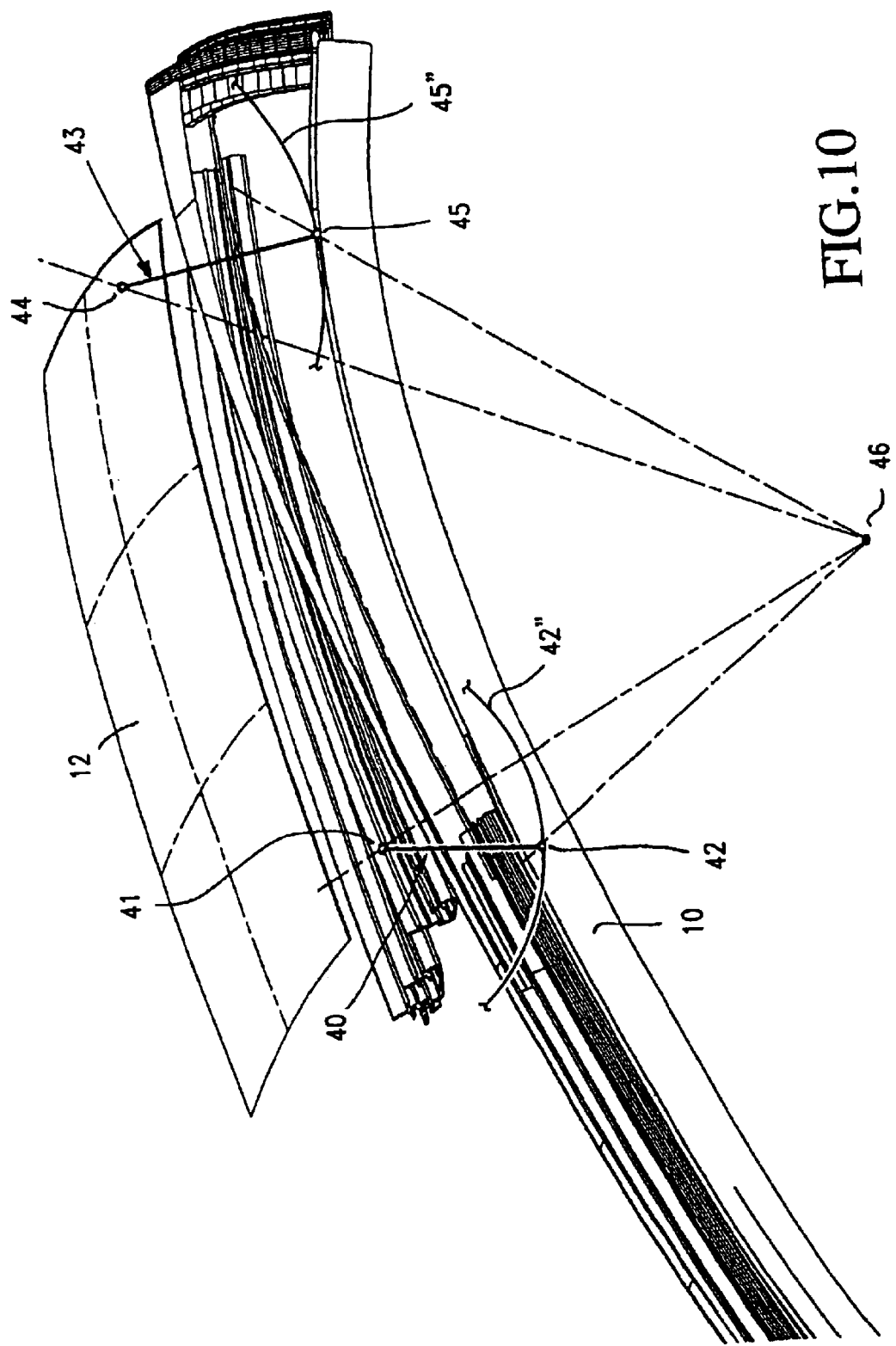
FIG. 10 is an enlarged perspective plan view of the side roof member of the embodiment shown in FIG. 8 in an intermediate swivelling position.
Figure 11:
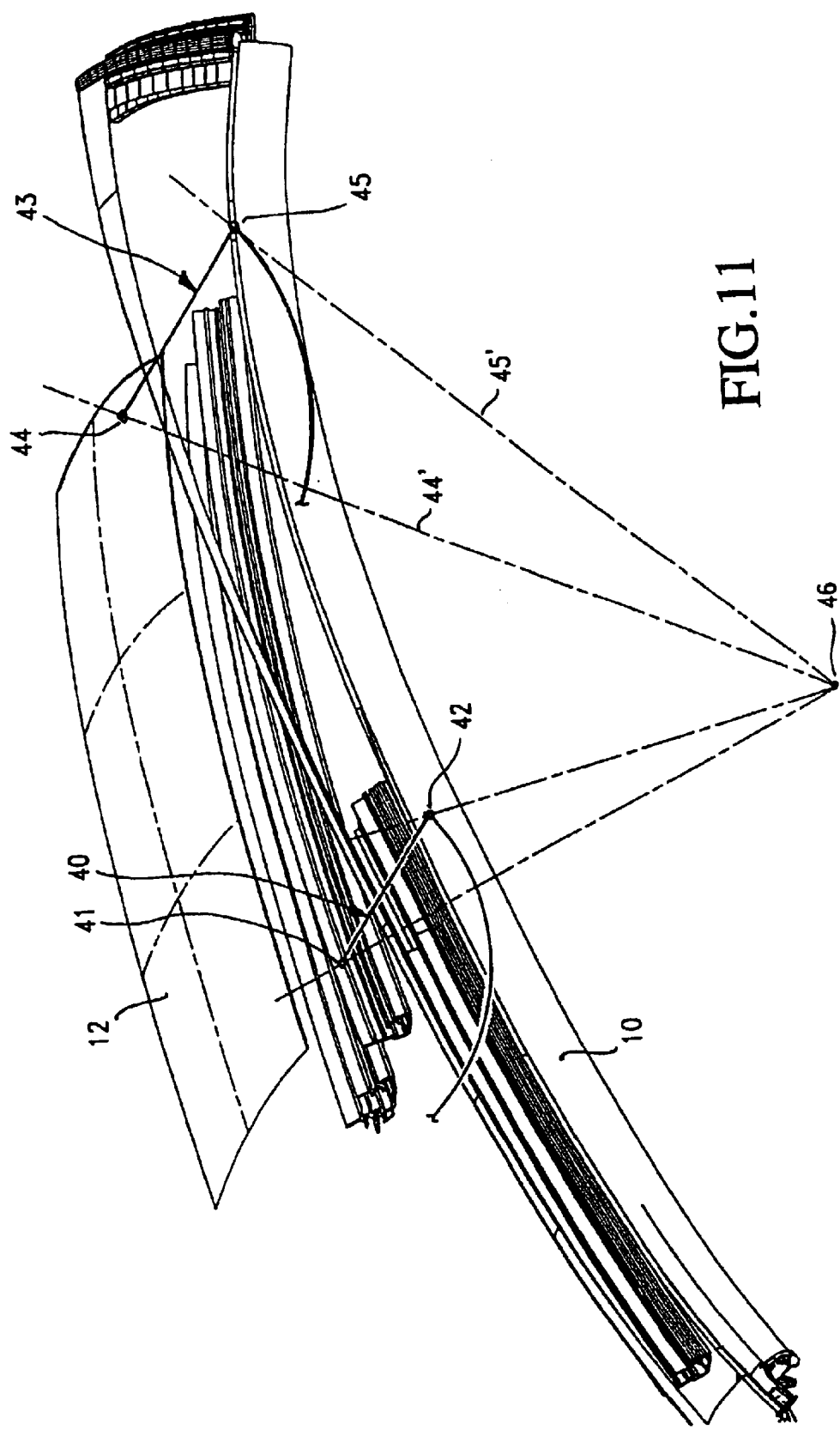
FIG. 11 is an enlarged perspective plan view of the side roof member of the embodiment shown in FIG. 8 in the end swivelling position with the roof opened.
Figure 12:
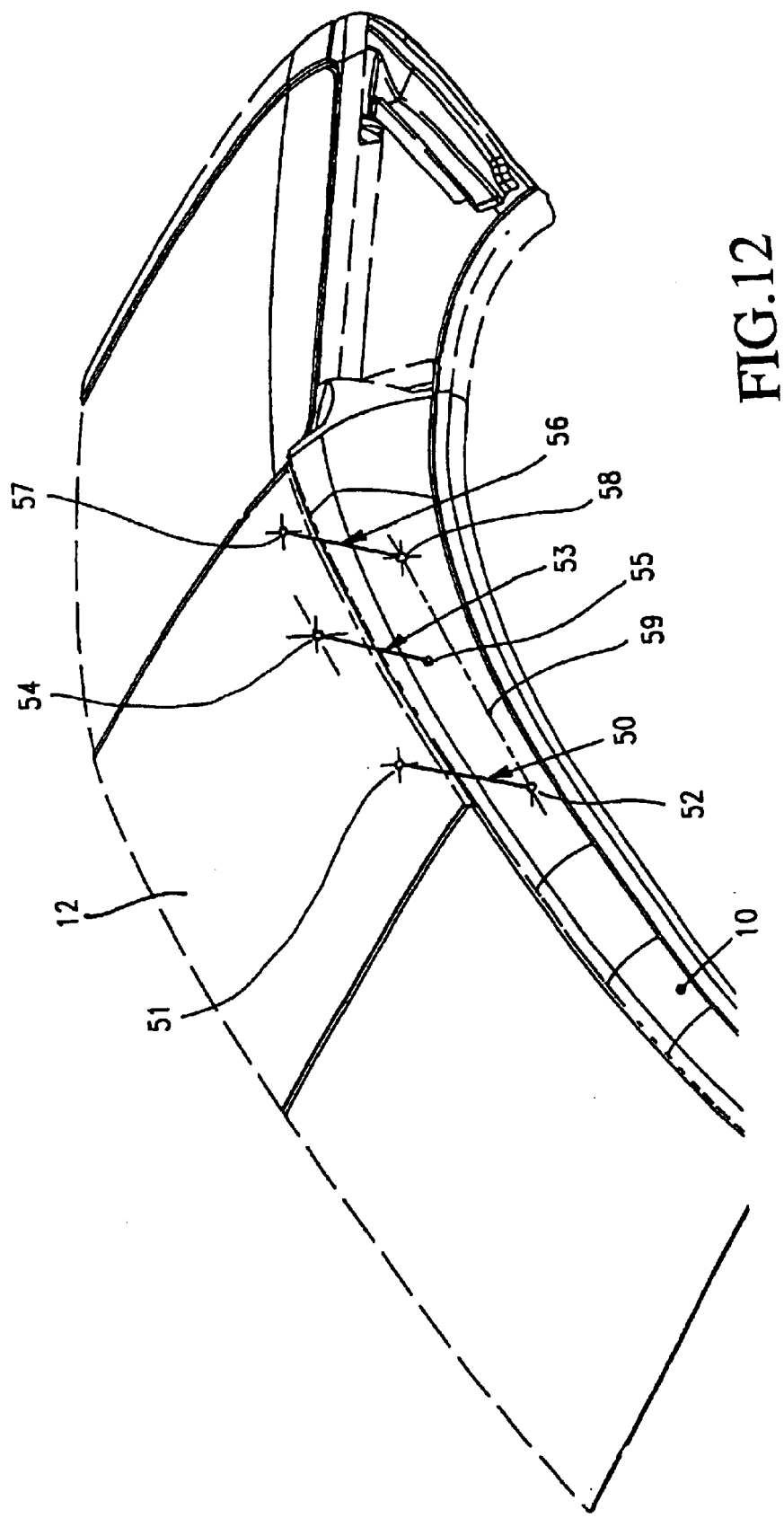
FIG. 12 is a perspective view of the left half of the closed motor vehicle roof with a third embodiment of a swivel bearing means for the movable roof part.

The second embodiment of the swivel bearing means 28 (see FIGS. 8 to 11) is formed as a spherical four-joint linkage and contains a front connecting rod 40 which is coupled by a joint 41 to the rear roof part 12 and a joint 42 to the side roof member 10, and a rear connecting rod 43 which is coupled by a joint 44 to the rear roof part 12 and a joint 45 to the side roof member 10 (the connecting rods are shown schematically as lines). The swiveling axes 41', 44' of the joints 41, 44 located on the rear roof part 12 and the swivelling axes 42', 45' of the joints 42, 45 located on the side roof member 10 meet at a common intersection point 46. The paths or curves 42". 45" of motion of the two joints 42, 45 located on the side roof member 10 lie on a spherical surface in the swivelling motion of the side roof member 10 out of its position with the roof closed (FIG. 9) via an intermediate position (FIG. 10) up to its maximum swivelling position (FIG. 11) in which the opened motor vehicle roof can be lowered into the stowage space 22.

Driving takes place, for example, via a rear connecting rod 43 which executes swiveling motion over a smaller swivelling angle relative to the front connecting rod 42.

Depending on the common intersection point 46, different swivelling behavior of the side roof member 10 relative to the roof part 12 can be set.

Figure 13:
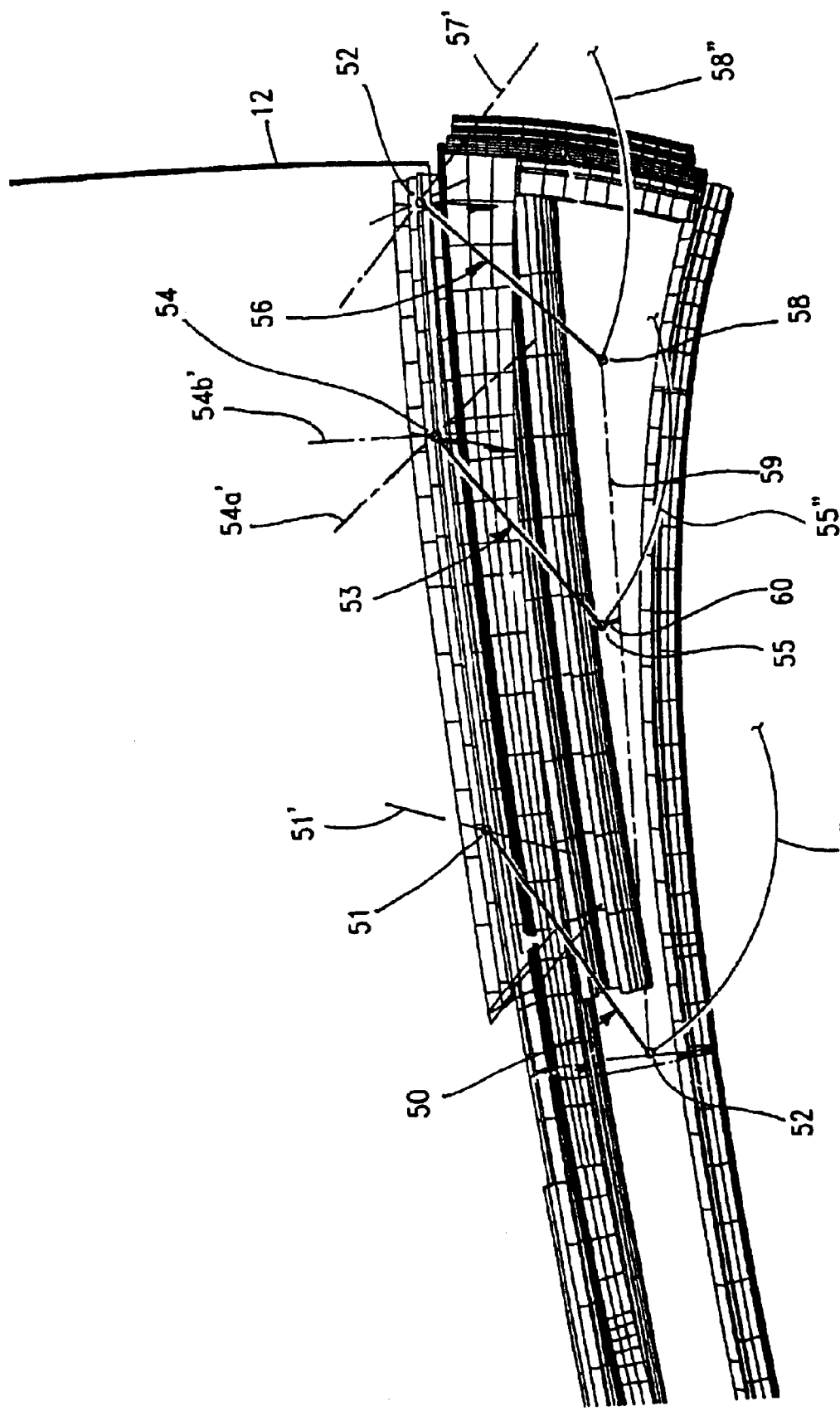
FIG. 13 is an enlarged perspective plan view of the side roof member of the embodiment shown in FIG. 12, with the roof closed.
Figure 14:
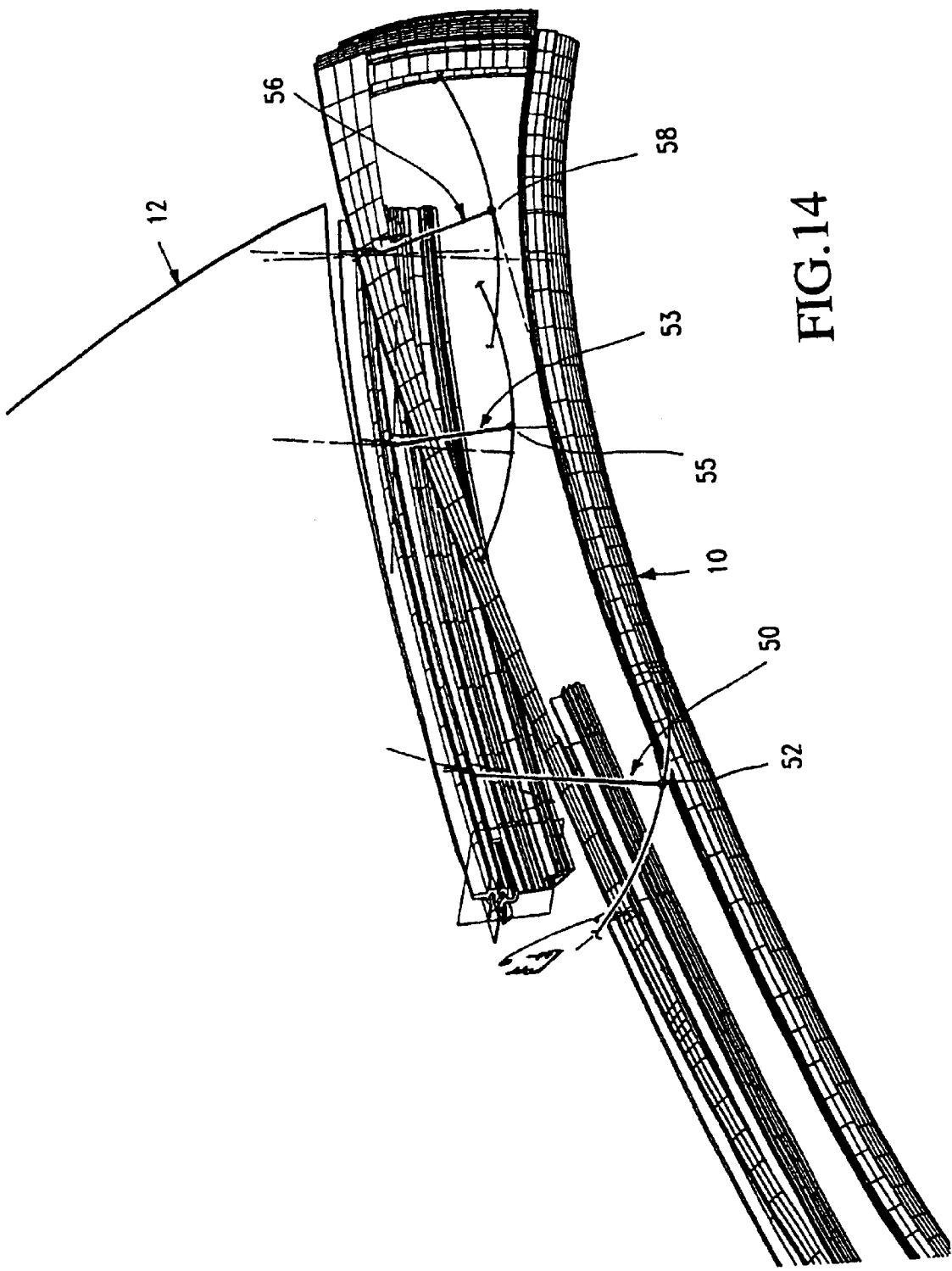
FIG. 14 is an enlarged perspective plan view of the side roof member of the embodiment shown in FIG. 12 in an intermediate swivelling position.
Figure 15:
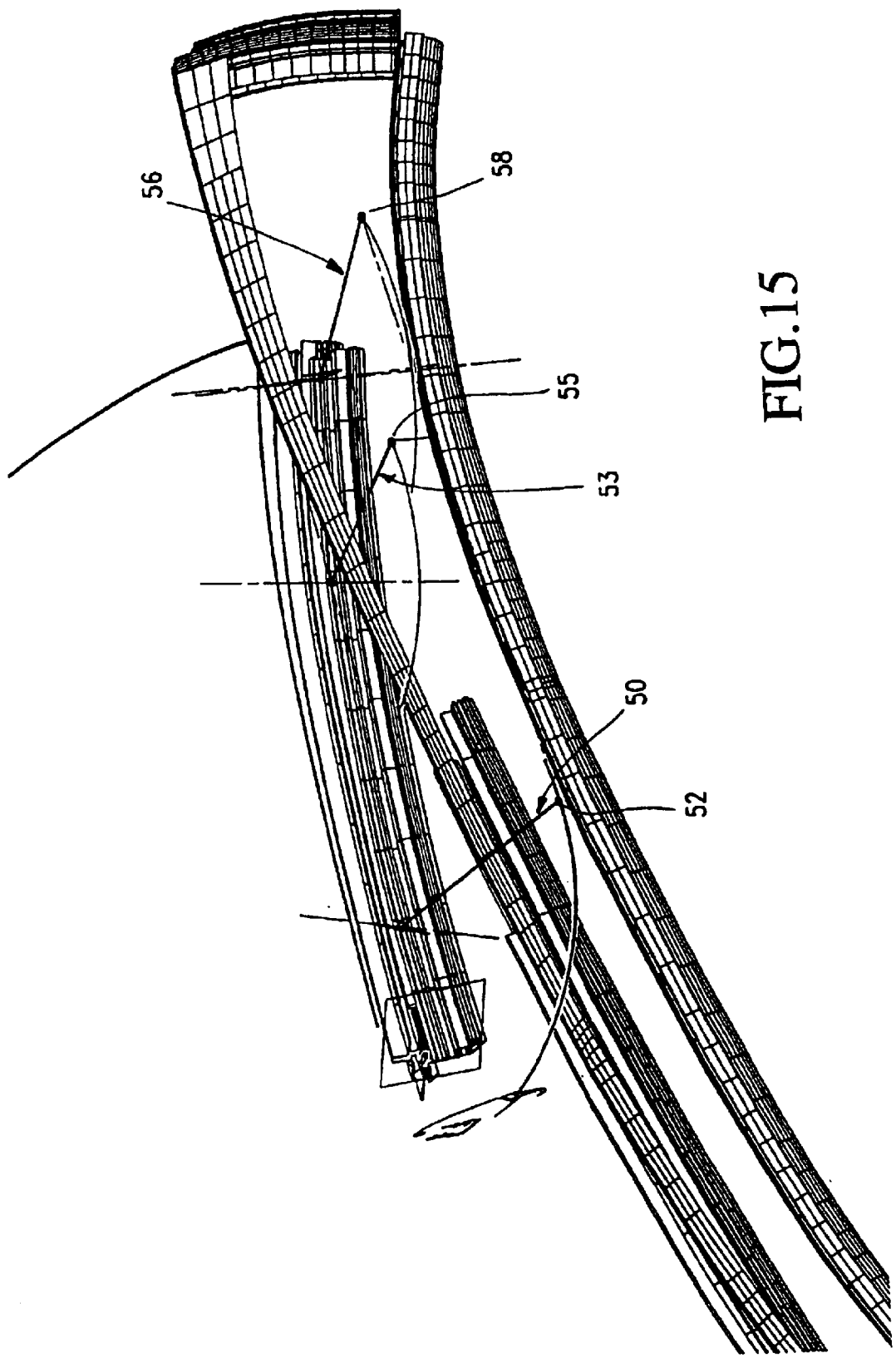
FIG. 15 is an enlarged perspective plan view of the side roof member of the embodiment shown in FIG. 12 in the end swivelling position with the roof opened.
Figure 16:
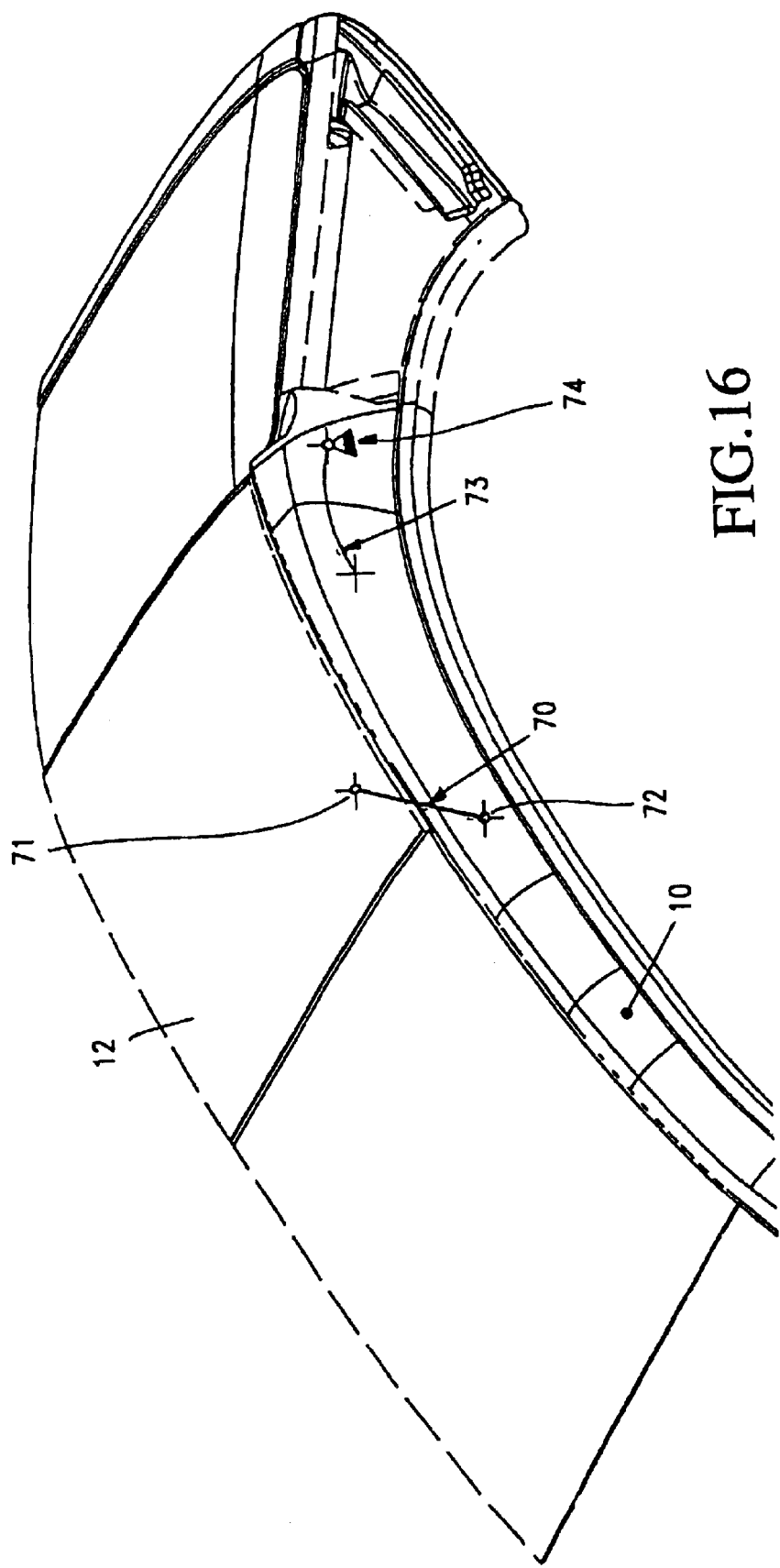
FIG. 16 is a perspective view of the left half of the closed motor vehicle roof with a fourth embodiment of a swivel bearing means for the movable roof part.

The third embodiment of the swivel bearing means 28 (see FIGS. 12 to 15) is formed as a spherical seven-joint linkage and contains a front connecting rod 50 which is coupled by a joint 51 to the rear roof part 12 and a joint 52 to the side roof member 10, and a middle connecting rod 53 which is coupled by a joint 54 to the rear roof part 12 and a joint 55 to the side roof member 10, and a rear connecting rod 56 which is coupled by a joint 57 to the rear roof part 12 and a joint 58 to the side roof member 10 (the connecting rods are shown schematically as lines). The joints 51, 57 located on the roof part 10 are turning knuckles with swivelling axes 51', 57' and the joint 54 is a cardan joint with two swivelling axes 54a', 54b', none of these swivelling axes being parallel to one another or all being skewed. The joints 52, 55 and 58 are socket joints, the two joints 52, 58 moving on plane curved paths 52", 58" and the joint 55 on a three-dimensional curved path 55". For operation of the three-dimensional, seven-joint linkage the joint 55 should not lie on the connecting lines 59 between the joints 52 and 58. The connecting rod 53 controls the tilting motion of the side roof member 10 via a lever arm 60 between the joint 55 and the connecting lines 59 from the initial position of the side roof member 10 into the closed position of the motor vehicle roof (FIG. 13) via an intermediate position (FIG. 14) into the end position with the roof opened (FIG. 15).

Driving can proceed, for example, via the front connecting rod 50 or the rear connecting rod 56.

The fourth embodiment of the swivel bearing means 28 (see FIGS. 16 to 22) is formed as a combination of turning knuckles and prismatic joints and contains a front connecting rod 70 which is coupled by a joint 71 to the rear roof part 12 and a joint 72 to the side roof member 10, and a guide slot 73 which is located on the side roof member 10 and on which a swivel bearing 74 which is attached to the rear roof part 12 is movably guided. The swivel bearing 74 is for example a journal which can be swivelled relative to the guide slot 73, as well as movably guided in the guide slot 73. The swivelling plane of the connecting rod 70 is inclined to the vertical so that the side roof member 10 is guided to the outside via the swivelling connecting rod 70.

Figure 17:
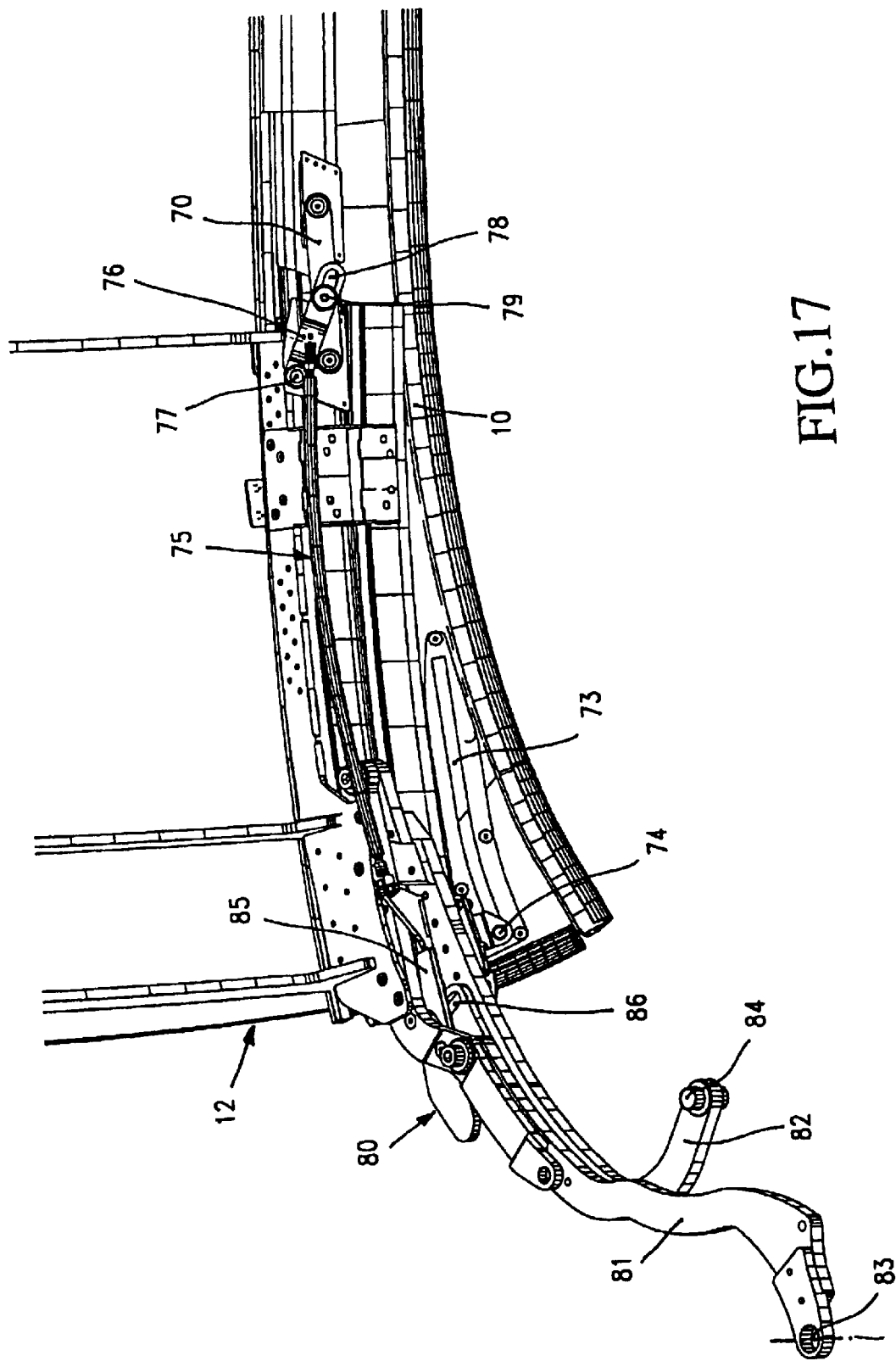
FIG. 17 is an enlarged perspective inside view of the side roof member of the embodiment shown in FIG. 16, with the roof closed.
Figure 18:
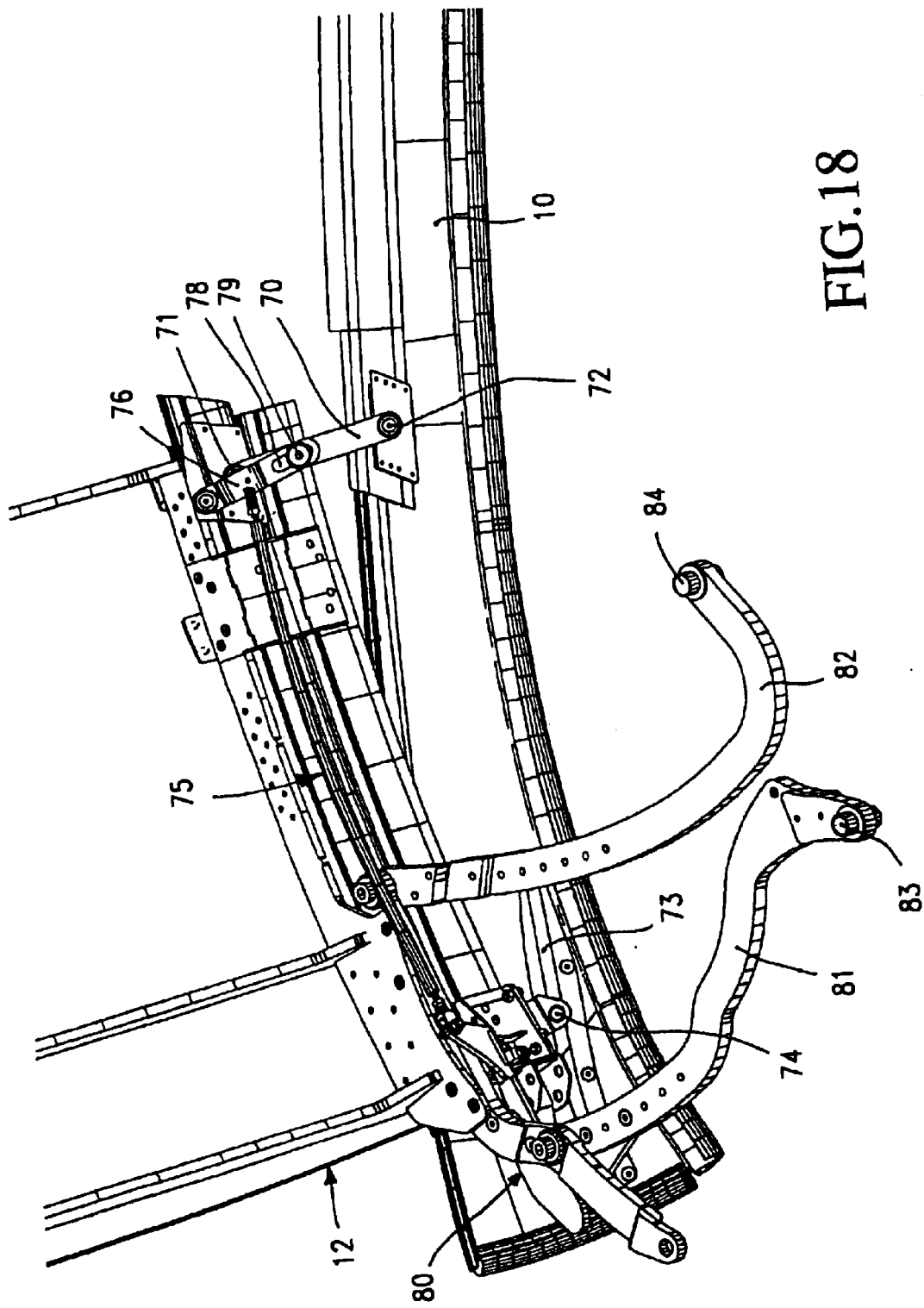
FIG. 18 is an enlarged perspective inside view of the side roof member of the embodiment shown in FIG. 16 in an intermediate swivelling position.
Figure 19:
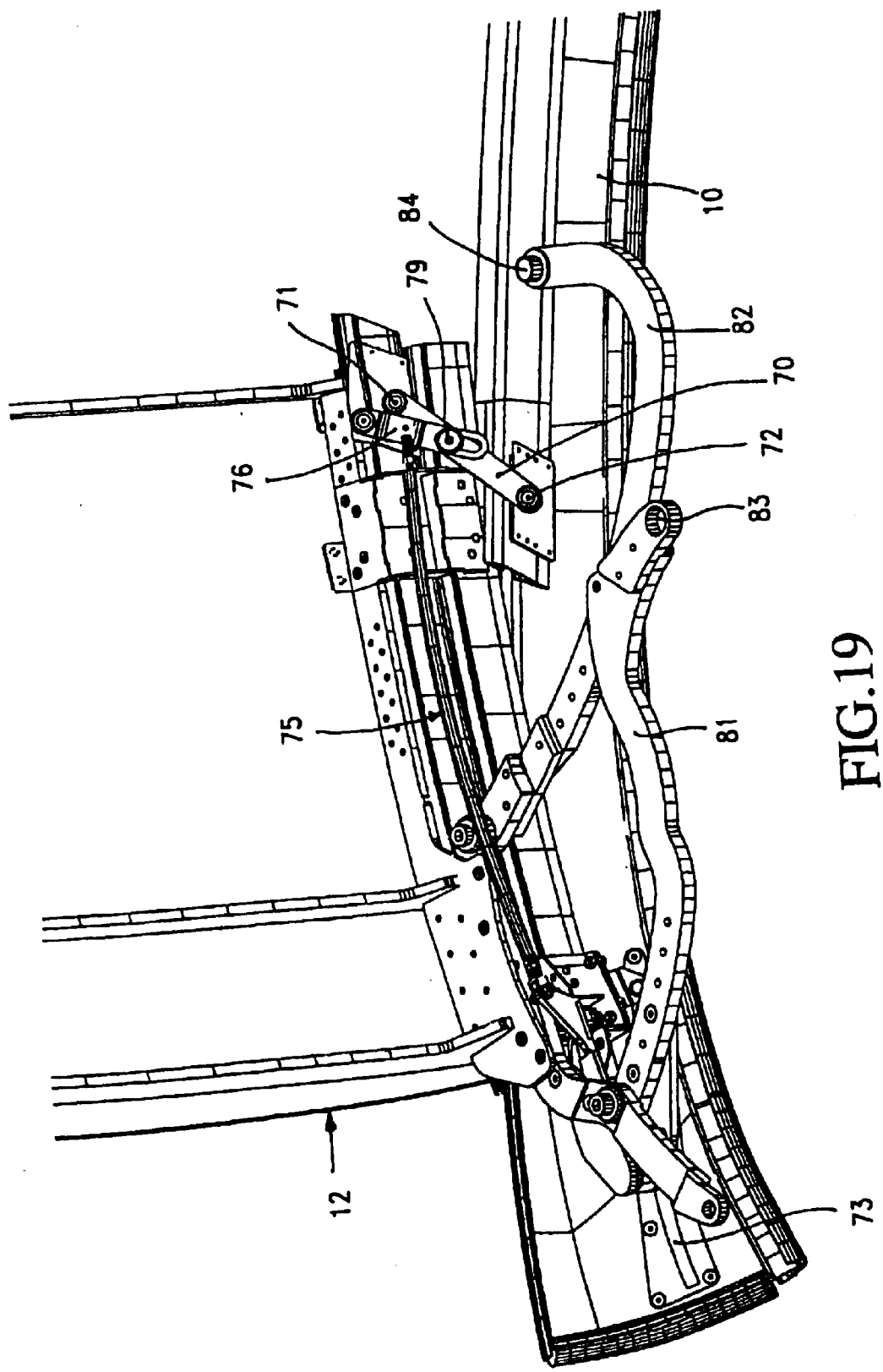
FIG. 19 is an enlarged perspective inside view of the side roof member of the embodiment shown in FIG. 16 in the end swivelling position with the roof opened.
Figure 20:
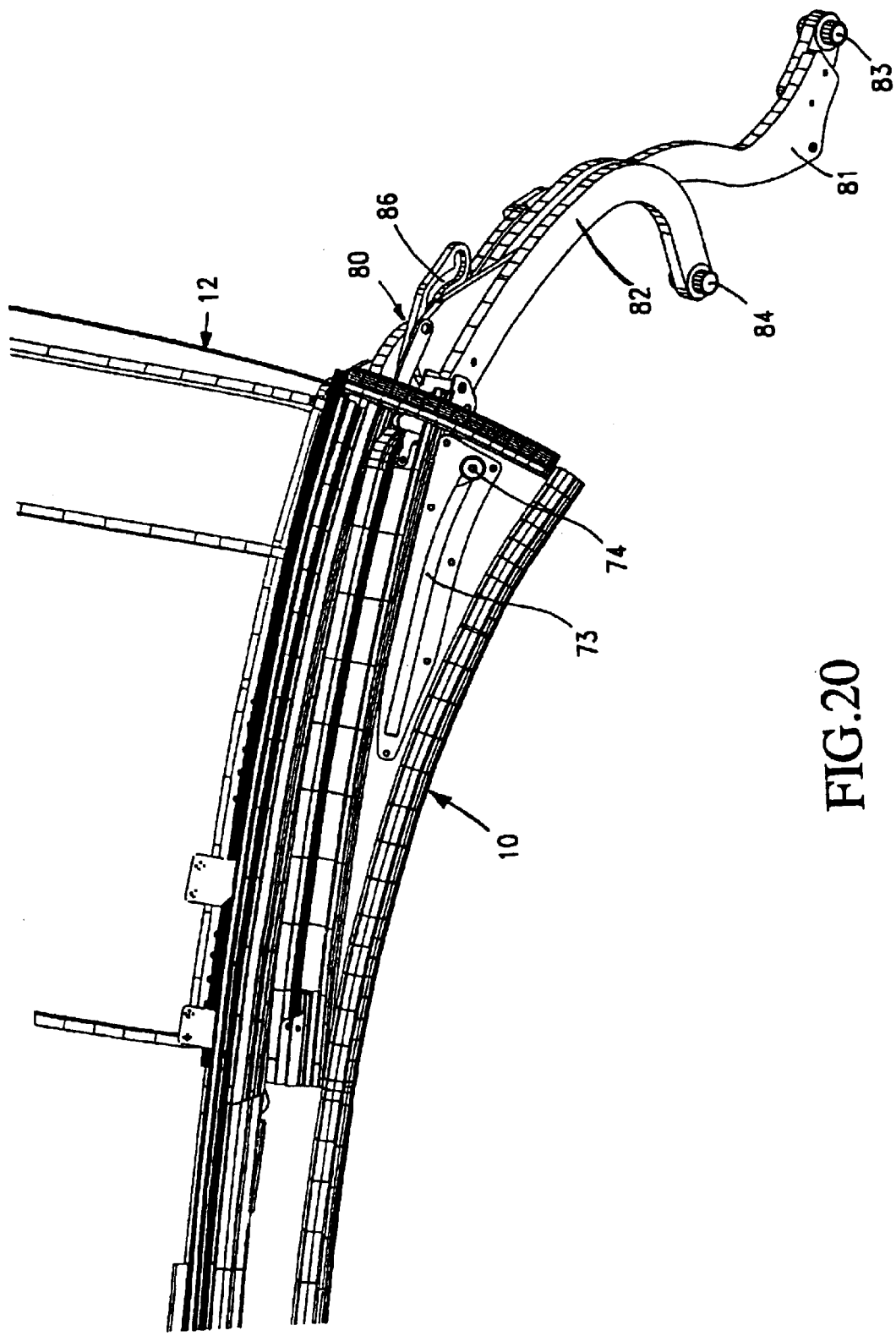
FIG. 20 is a perspective plan view of the side roof member according to FIG. 17 with the roof closed.
Figure 21:
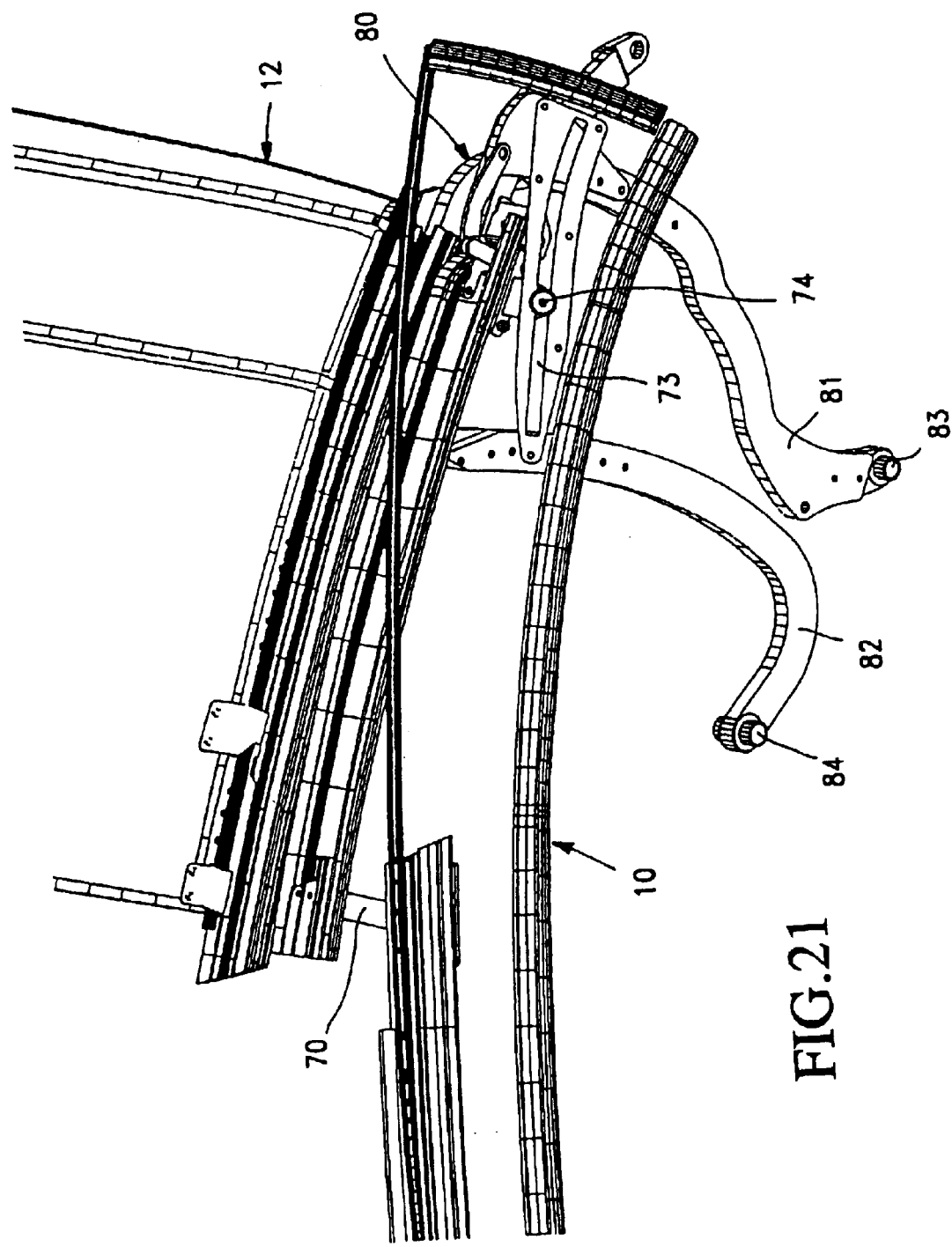
FIG. 21 is a perspective plan view the side roof member as shown in FIG. 18 in the intermediate swivelling position.
Figure 22:
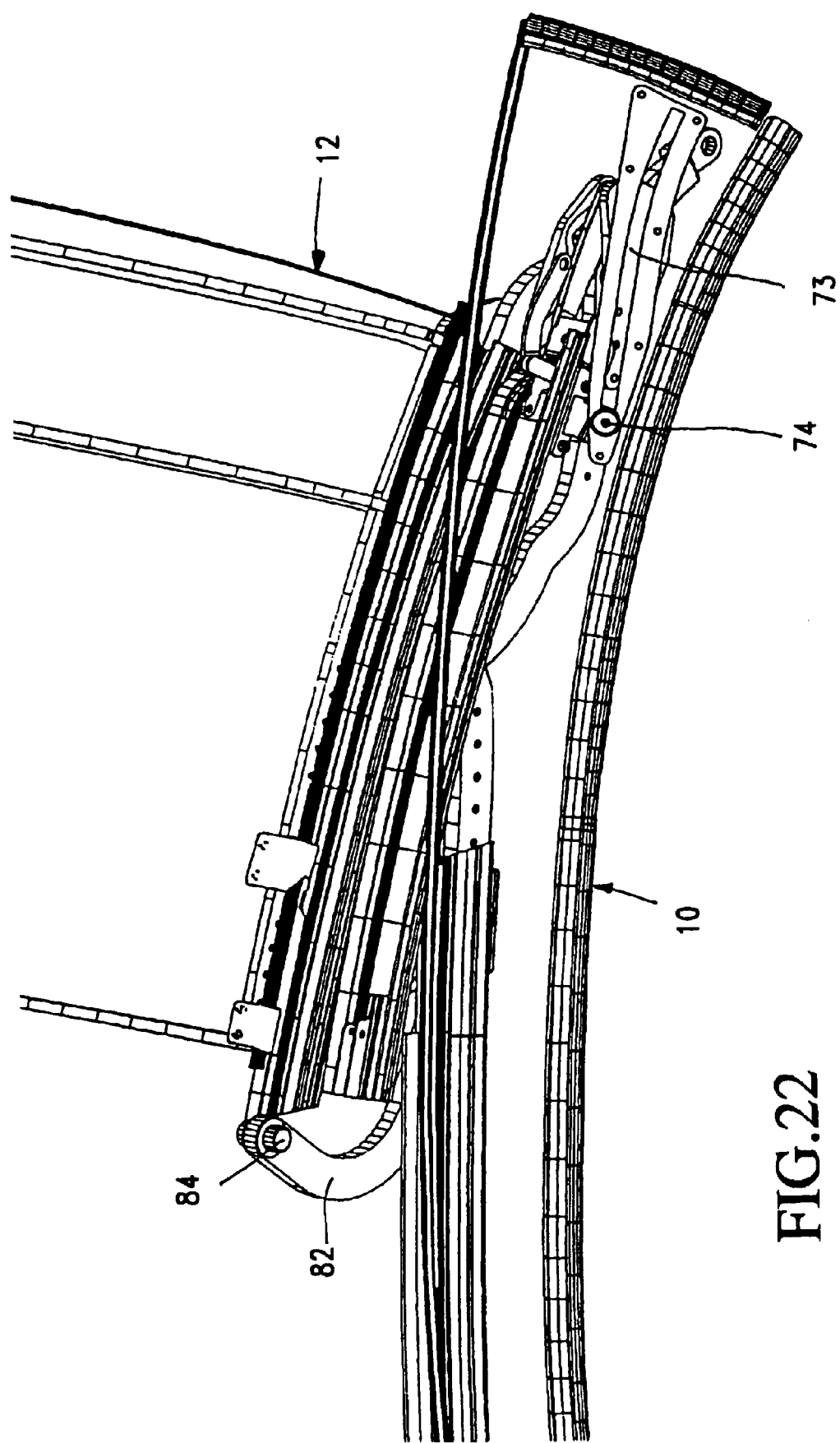
FIG. 22 is a perspective plan view the side roof member of FIG. 19 in the end swivelling position with the roof opened.

Swivelled driving takes place via the front connecting rod 70 by means of a drive rod 75 which is coupled to a step-up lever 76 which, on the one hand, is guided on the roof part 12 in a bearing 77, and on the other hand, via an elongated hole 78 in a journal 79 which is attached to the connecting rod 70 and which fits into the elongated hole 78. The drive rod 75 is moved by a drive mechanism 80 with movement derived from the swivelling motion of the two connecting rods 81, 82 of the main four-joint linkage which support the rear roof part 12 on the body in the swivel bearings 83, 84. The drive mechanism 80 contains a control part 85 which is connected to the drive rod 75 and can be moved in the lengthwise direction via engagement in a control slot 86 which swivels with the rear connecting rod 81. FIGS. 17 & 20 show the side roof member 10 with the motor vehicle roof closed. FIGS. 18 & 21 show the side roof member 10 swivelled relative to the motor vehicle roof in the intermediate position when the motor vehicle roof is opened and FIGS. 19 & 22 show the swivelled side roof member 10 which has been moved back relative to the rear roof part 12 in the opened end position of the motor vehicle roof.

What is claimed is:

1. Convertible motor vehicle roof with a roof part, a rear part which adjoins the roof part, and with side roof members which are pivotally coupled on both sides to the roof part, the rear part together with the roof part and the side roof members being lowerable into a stowage space to open the motor vehicle roof; wherein the side roof members are outwardly swivelable before or during lowering into the storage space; wherein a swivel bearing mechanism supports each side roof member on the roof part, said swivel bearing mechanism comprising a connecting rod and one of a second connecting rod and a guide slot.

2. Motor vehicle roof as claimed in claim 1, wherein said connecting rod is a front connecting rod and said one of a second connecting rod and a guide slot is a rear connecting rod; and wherein said front and rear connecting rods form a planar four-joint linkage in which all axes of the four-joint linkage are perpendicular to an inclined plane.

3. Motor vehicle roof as claimed in claim 2, wherein the rear connecting rod is adapted to drive the swivel bearing mechanism, the rear connecting rod moving through a smaller rotational angle than said front connecting rod.

4. Motor vehicle roof as claimed in claim 1, wherein said connecting rod is a front connecting rod and said one of a second connecting rod and a guide slot is a rear connecting rod; and wherein the front connecting rod and the rear connecting rod form a spherical four-joint linkage in which all axes of the four-joint linkage meet at an intersection point.

5. Motor vehicle roof as claimed in claim 4, wherein the rear connecting rod is adapted to drive the swivel bearing mechanism, the rear connecting rod moving through a smaller rotational angle than said front connecting rod.

6. Motor vehicle roof as claimed in claim 1, wherein said connecting rod is a front connecting rod and said one of a second connecting rod and a guide slot is a rear connecting rod; wherein the swivel bearing mechanism further comprises a middle connecting rod; wherein said connecting rods form a three-dimensional, seven-joint linkage; wherein joints of the linkage located on the side roof members are socket joints with a socket joint of the middle connecting rod being located outside a connecting line between socket joints of front and the rear connecting rod.

7. Motor vehicle roof as claimed in claim 6, wherein the swivel bearing mechanism is drivable at one of the front connecting rod and the rear connecting rod.

8. Motor vehicle roof as claimed in claim 6, wherein the middle connecting rod is adapted to control tilting motion of the side roof member via a lever arm.

9. Motor vehicle roof as claimed in claim 1, wherein said connecting rod is a front connecting rod and said one of a second connecting rod and a guide slot is a guide slot which is located on the side roof member and in which a swivel bearing of the roof part is movably supported.

10. Motor vehicle roof as claimed in claim 9, wherein the swivel bearing mechanism is drivable by the front connecting rod.

11. Motor vehicle roof as claimed in claim 1, further comprising a drive means for driving the swivel bearing mechanism, said drive means being movable by motion of bearing means which supports the roof part on the body.

* * * * *